(12) United States Patent
Kim et al.

(10) Patent No.: US 7,221,855 B2
(45) Date of Patent: May 22, 2007

(54) METHOD FOR MANAGING RECORDING AND REPRODUCTION OF MULTI-DUBBED AUDIO STREAM

(75) Inventors: Mi Hyun Kim, Seoul (KR); Sung Ryun Cho, Seoul (KR); Byung Jin Kim, Sungnam (KR); Kang Soo Seo, Anyang (KR); Sung Wan Park, Suwon-si (KR)

(73) Assignee: LG Electronics Inc., Seoul (KR)

( * ) Notice: Subject to any disclaimer, the term of this patent is extended or adjusted under 35 U.S.C. 154(b) by 218 days.

(21) Appl. No.: 10/421,836

(22) Filed: Apr. 24, 2003

(65) Prior Publication Data
US 2003/0202774 A1 Oct. 30, 2003

(30) Foreign Application Priority Data
Apr. 25, 2002 (KR) .................. 10-2002-0022810

(51) Int. Cl.
*H04N 5/91* (2006.01)
(52) U.S. Cl. .......................... 386/96; 386/46
(58) Field of Classification Search .............. 386/46, 386/52, 54, 95–97, 99, 124–126; 369/84; 725/93, 101, 10, 116; 707/104.1, 10, 102
See application file for complete search history.

(56) References Cited

U.S. PATENT DOCUMENTS

| 5,892,915 | A | * | 4/1999 | Duso et al. ................. 725/93 |
| 5,917,781 | A | * | 6/1999 | Kim ........................ 386/97 |
| 6,446,080 | B1 | * | 9/2002 | Van Ryzin et al. ...... 707/104.1 |
| 6,453,119 | B1 | * | 9/2002 | Maruyama et al. .......... 386/95 |

* cited by examiner

*Primary Examiner*—Thai Tran
*Assistant Examiner*—Christopher Onuaku
(74) *Attorney, Agent, or Firm*—Birch, Stewart, Kolasch & Birch, LLP

(57) ABSTRACT

A method for managing recording and reproduction of a multi-dubbed audio stream. This method includes the steps of producing virtual play lists, the number of which corresponds to the number of dubbed audio streams desired by a user in association with the clip-unit main A/V stream, for reading and reproduction of the dubbed audio streams, and recording a common play item, for reading and reproduction of the clip-unit main A/V stream, in the virtual play lists, while recording distinct sub play items, for reading and reproduction of the dubbed audio streams associated therewith, in the virtual play lists, respectively. Management information for search and management of play lists for multiple dubbed audio streams is also recorded in the file structure of a rewritable storage medium such as BD-RE (Blu-Ray Disc Rewritable). Accordingly, it is possible to additionally record and manage multiple dubbed audio streams associated with one clip-unit main A/V stream, and to selectively reproduce diverse dubbed audio streams desired by the user.

8 Claims, 5 Drawing Sheets

FIG. 5 info.dvr - syntax

| info.dvr { |
|---|
| version_number |
| TableOfPlayLists_start_address |
| MarkersPrivateData_start_address |
| reserved_for_future_use |
| UIAppInfoDVR() |
| for(i=0; i<N1; i++){ |
| padding_word |
| } |
| TableOfPlayLists() |
| for(i=0; i<N2; i++){ |
| padding_word |
| } |
| MakersPrivateData() |
| for(i=0; i<N3; i++){ |
| padding_word |
| } |
| } |

| MakersPrivateData(){ |
|---|
| length |
| if(length !=0){ |
| data_block_start_address |
| reserved_for_word_align |
| number_of_maker_entries |
| for (i=0; i<number_of_maker_entries; i++){ |
| maker_ID |
| maker_model_code |
| ⋮ |
| } |
| data_block { |
| muti_dub_exit_flag |
| if(multi_dub_exit_flag){ |
| set_multi_dub_VPL_number |
| for(i=0; i<set_multi_dub_VPL_number; i++){ |
| ref_RPL_index |
| dub_total_VPL_number |
| for(j=0; j<set_total_VPL_number; j++){ |
| VPL_index [ j ] |
| } |

# METHOD FOR MANAGING RECORDING AND REPRODUCTION OF MULTI-DUBBED AUDIO STREAM

BACKGROUND OF THE INVENTION

1. Field of the Invention

The present invention relates to a method for managing recording and reproduction of a multi-dubbed audio stream corresponding to an A/V stream recorded on a storage medium such as a high-density rewritable optical disc.

2. Description of the Related Art

Recently, standardization of new high-density rewritable optical discs has rapidly progressed, for example, BD-RE (Blu-Ray Disc Rewritable), which can store a large quantity of high-quality video and audio data. As a result, products associated with such discs have also been developed. Such products are expected to be commercially available in the near future.

FIG. 1 illustrates a part of the configuration of an optical disc apparatus such as a video disc recorder (VDR) for recording or reproducing signals recorded on a storage medium such as a BD-RE. As shown in FIG. 1, the optical disc apparatus includes an optical pickup 2 for reading out a signal recorded on a storage medium 1 such as a BD-RE or recording a data stream externally inputted thereto and subjected to a signal processing procedure, a VDR system 3 for reproducing the signal read out by the optical pickup 2 or converting a data stream externally inputted thereto into a data stream to be appropriately recordable, and an encoder 4 for encoding an analog signal externally inputted thereto, and outputting the encoded signal to the VDR system 3.

The VDR system 3 of the optical disc apparatus having the above mentioned configuration may manage recording of a dubbed audio stream, as an auxiliary audio stream, corresponding to the A/V stream recorded on the BD-RE 1. This will be described in detail hereinafter.

FIG. 2 illustrates a linked condition between real play lists and virtual play lists in a rewritable optical disc, for example, a BD-RE. A/V streams are sequentially recorded on a BD-RE, for example, the BD-RE 1 of FIG. 1, in the unit of clips, and managed for recording and reproduction thereof by real play lists containing play control information for reading and reproduction of the A/V streams in the unit of clips and being recorded on the BD-RE 1, respectively. For example, a main A/V stream corresponding to a first clip, that is, a first clip main A/V stream (Clip 1 Main A/V Stream), is managed for its recording and reproduction by a first real play list (Real PlayList 1) containing play control information for reading and reproduction of the first clip main A/V stream, as shown in FIG. 2.

Meanwhile, a dubbed audio stream corresponding to a clip main stream is additionally recorded on the BD-RE 1 as a new clip auxiliary audio stream or a clip dubbed audio stream. For example, a dubbed audio stream corresponding to the first clip main stream linked to the first real play list is recorded as a second clip dubbed audio stream (Clip 2 Auxiliary Audio Stream). This second clip dubbed audio stream is managed for its recording and reproduction by a second real play list (Real PlayList 2).

Also, the VDR system 3 of the above mentioned optical disc apparatus produces and records virtual play lists in order to allow the user to optionally select, edit, and play real play lists recorded and managed in the above mentioned procedure. As shown in FIG. 2, such a virtual play list, for example, a first virtual play list (Virtual PlayList 1) associated with the first real play list, may include a play item (PlayItem) for a main path adapted to read out and reproduce the first clip main A/V stream linked to the first real play list, and a sub play item (SubPlayItem) for a sub path adapted to read out and reproduce the second clip dubbed audio stream linked to the second real play list.

Accordingly, the VDR system 3 of the optical disc apparatus can selectively reproduce the second clip dubbed audio stream managed by the second real play list at the request of the user during a reproducing operation thereof in which the first clip main A/V stream managed by the first real play list is read out and reproduced. Thus, the user can view the video image of the first clip main A/V stream and simultaneously listen to the audio sound of the second clip dubbed audio stream.

In rewritable optical discs such as the above mentioned BD-RE, however, there is a limitation in that only one play item and only one sub play item can be recorded in a virtual play list produced and recorded in an editing procedure performed by the user. For this reason, only one dubbed audio stream can be additionally recorded and managed for each of clip main A/V streams sequentially recorded in the unit of clips. As a result, there is a problem in that it is impossible to record and manage several dubbed audio streams desired by the user and to link the dubbed audio streams to one clip main A/V stream. Nevertheless, there is no method capable of efficiently solving this problem.

SUMMARY OF THE INVENTION

Therefore, the present invention has been made in view of this problem, and an object of the invention is to provide a method for managing additional recording and reproduction of a multi-dubbed audio stream for a clip-unit main A/V stream recorded on a storage medium such as a high-density rewritable optical disc.

In accordance with one aspect, the present invention provides a method for managing recording of a multi-dubbed audio stream corresponding to a clip-unit main A/V stream, comprising the steps of: producing virtual play lists, the number of which corresponds to the number of dubbed audio streams desired by a user in association with the clip-unit main A/V stream, for reading and reproduction of the dubbed audio streams; and recording common link information, for reading and reproduction of the clip-unit main A/V stream, in the virtual play lists, while recording distinct link information, for reading and reproduction of the dubbed audio streams associated therewith, in the virtual play lists, respectively.

In accordance with another aspect, the present invention provides a method for recording and managing a multi-dubbed audio stream, comprising the steps of: producing and recording a real play list and virtual play lists for reading and reproduction of a clip-unit main A/V stream and a plurality of dubbed audio streams associated with the clip-unit main A/V stream, respectively; and recording management information for searching for and reading out the real play list and the virtual play lists, in an 'info.dvr' file included in a 'VD' directory having an order lower than a highest-order root directory in a file structure of a rewritable storage medium.

In accordance with another aspect, the present invention provides a method for managing reproduction of a multi-dubbed audio stream, comprising the steps of: searching for and reading out play list management information about multiple dubbed audio streams, which is recorded in a file, other than play list files, provided in a file structure of a rewritable storage medium; and reading out and reproducing a main A/V stream and multiple dubbed audio streams respectively linked to play lists identified by referring to the play list management information.

BRIEF DESCRIPTION OF THE DRAWINGS

The above objects, and other features and advantages of the present invention will become more apparent after a reading of the following detailed description when taken in conjunction with the drawings, in which:

FIGS. 4 and 5 are schematic diagrams each illustrating the syntax of an 'info.dvr' file in which management information about multiple dubbed audio streams is additionally recorded by the multi-dubbed audio stream recording and reproduction managing method according to the present invention.

DETAILED DESCRIPTION OF THE PREFFERRED EMBODIMENT

Now, preferred embodiments of a method for managing recording and reproduction of a multi-dubbed audio stream in accordance with the present invention will be described in detail with reference to the annexed drawings.

Figure 1:
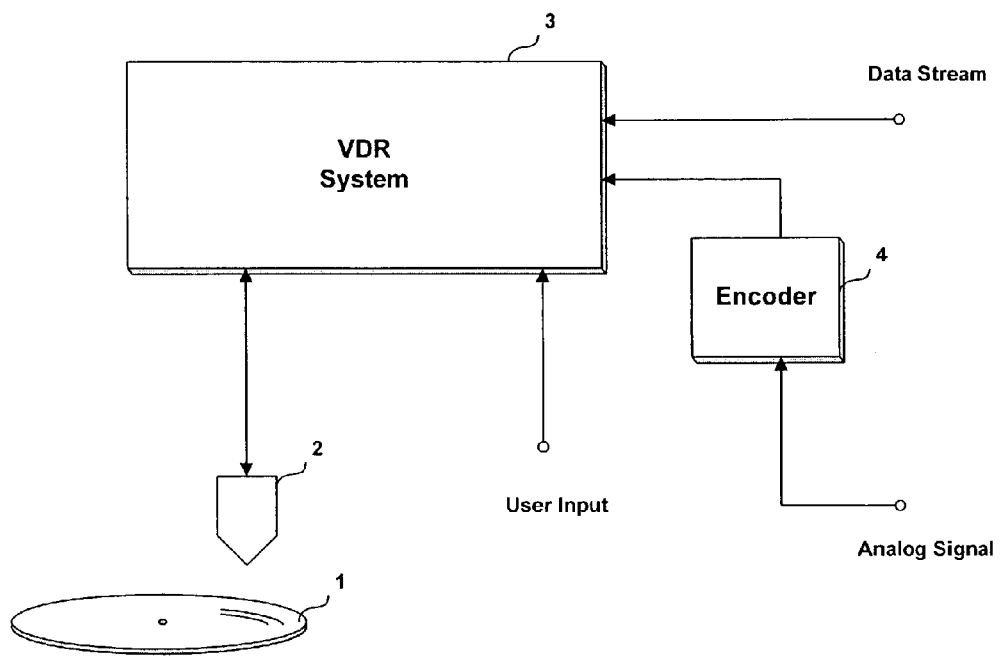
FIG. 1 is a schematic view illustrating a part of the configuration of an optical disc apparatus such as a video disc recorder (VDR)

The multi-dubbed audio stream recording and reproduction managing method according to the present invention is applicable to the optical disc apparatus having the configuration described hereinbefore in conjunction with FIG. 1. The VDR system 3 of the optical disc apparatus can additionally record multiple dubbed audio streams, desired by the user, corresponding to each of clip-unit A/V streams sequentially recorded on a BD-RE, for example, the BD-RE 1, in the unit of clips. The VDR system 3 can also produce management information for managing recording and reproduction of the multiple dubbed audio streams, so that the multiple dubbed audio streams are managed to be compatible with the file structure and format of the BD-RE 1.

Figure 3:
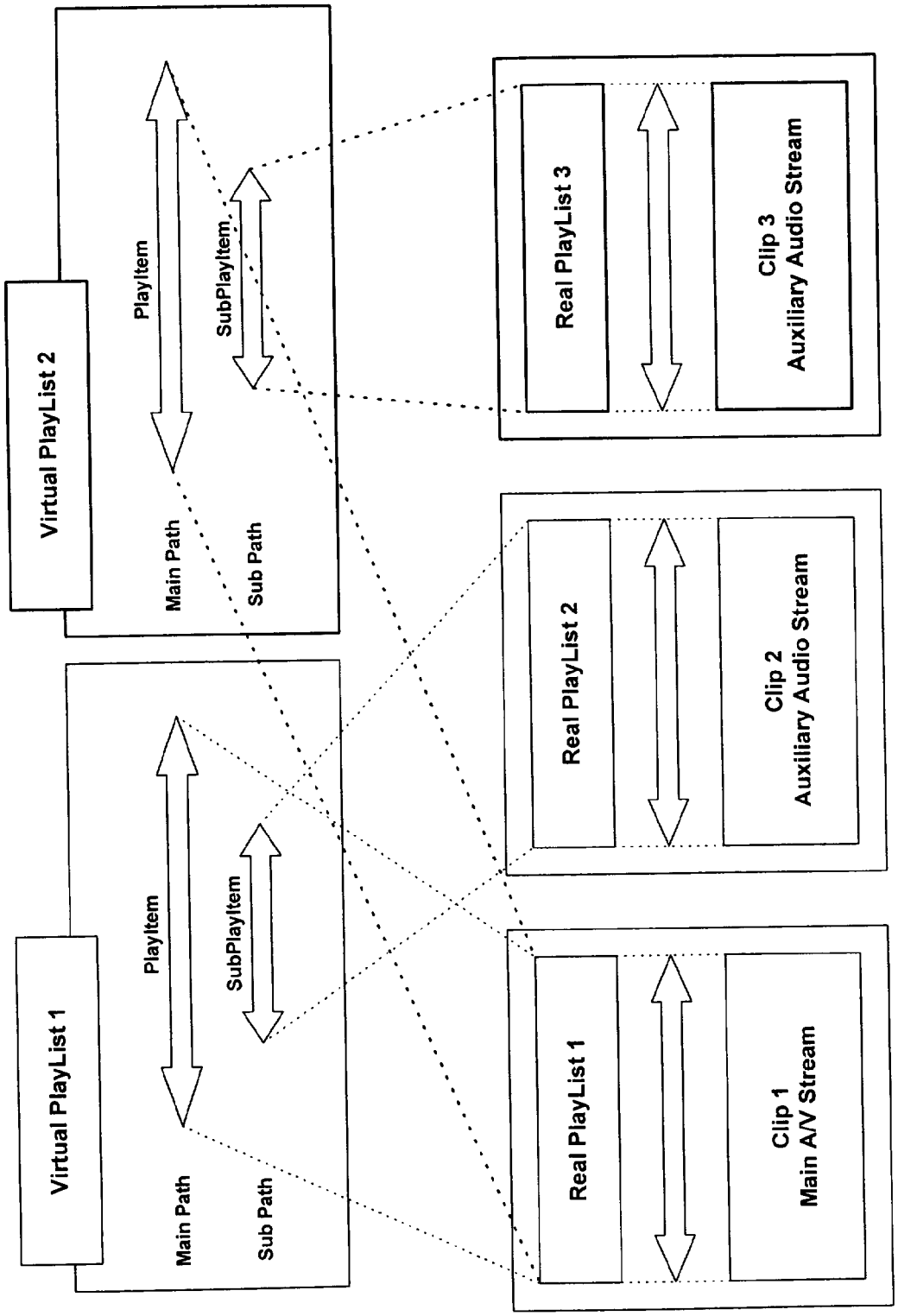
FIG. 3 is a schematic diagram illustrating a linked condition between real play lists and virtual play lists recorded and managed by a method for managing recording and reproduction of multi-dubbed audio stream in accordance with the present invention.

For example, as shown in FIG. 3, a main A/V streams, sequentially recorded on the BD-RE 1, of a first clip, that is, a first clip main A/V stream (Clip 1 Main A/V Stream), is managed for its recording and reproduction by a first real play list (Real PlayList 1) containing play control information for reading and reproduction of the first clip main A/V stream and being recorded. Also, a second clip auxiliary audio stream or a second clip dubbed audio stream (Clip 2 Auxiliary Audio Stream), which corresponds to the first clip main A/V stream and is additionally recorded, is managed for its recording and reproduction by a second real play list (Real PlayList 2) containing play control information for reading and reproduction of the second clip dubbed audio stream and being recorded.

Figure 2:
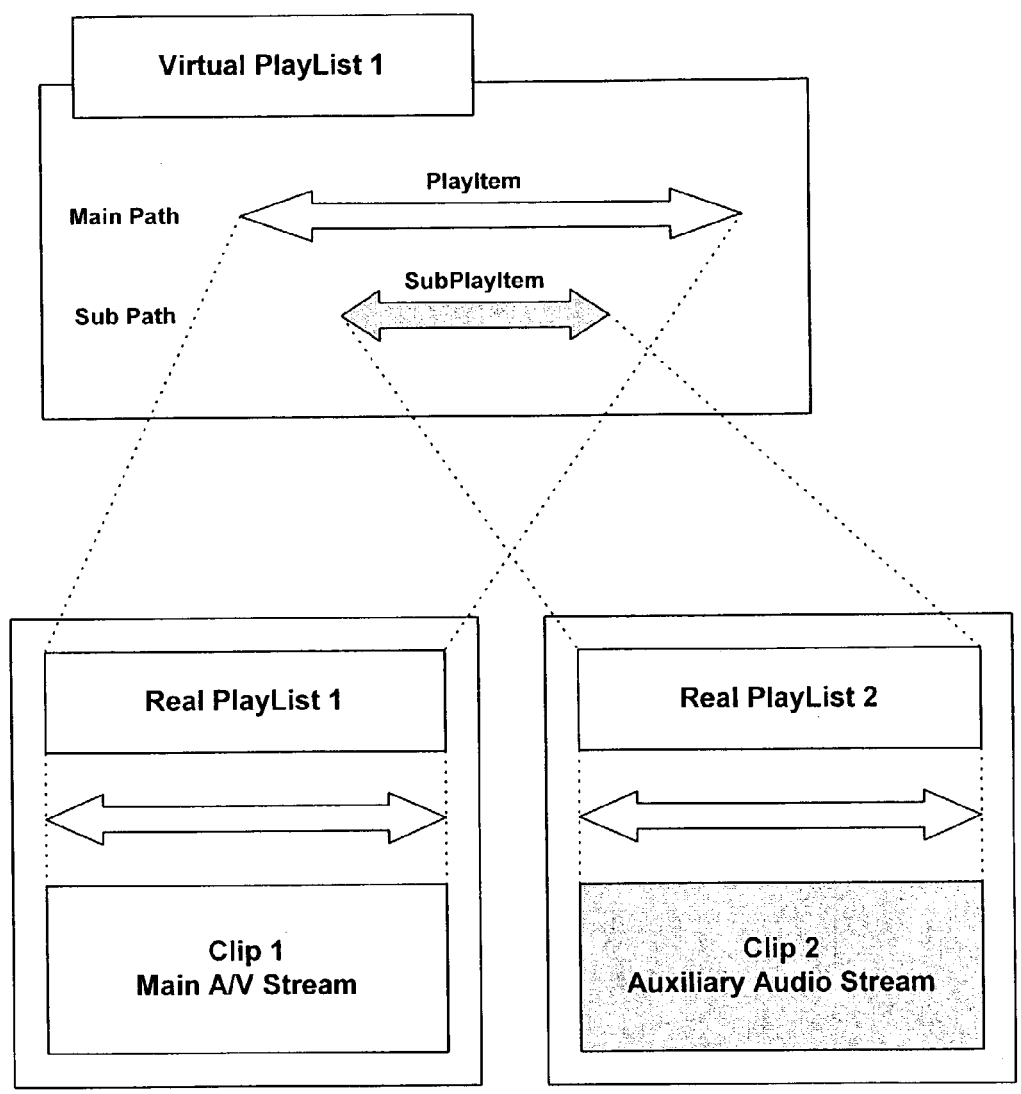
FIG. 2 is a schematic diagram illustrating a linked condition between real play lists and virtual play lists in a rewritable optical disc, for example, a BD-RE.

Also, the VDR system 3 of the optical disc apparatus produces and records virtual play lists (Virtual PlayList) in order to allow the user to optionally select, edit, and play real play lists recorded and managed in the above mentioned procedure. As described in conjunction with FIG. 2, such a virtual play list, for example, a first virtual play list (Virtual PlayList 1) associated with the first real play list, is recorded with a play item (PlayItem) for a main path adapted to read out and reproduce the first clip main A/V stream linked to the first real play list, and a sub play item (SubPlayItem) for a sub path adapted to read out and reproduce the second clip dubbed audio stream linked to the second real play list.

Meanwhile, under the condition in which the dubbed audio stream corresponding to the first clip main A/V stream, that is, the second clip dubbed audio stream, is additionally recorded, as described above, the VDR system 3 may be requested by the user to additionally record another dubbed audio stream corresponding to the first clip main A/V stream. In this case, the VDR system 3 records the additional dubbed audio stream as a third clip auxiliary audio stream or a third clip dubbed audio stream (Clip 3 Auxiliary Audio Stream).

Also, a third real play list (Real PlayList 3) is produced and recorded which contains play control information for reading and reproduction of the third clip dubbed audio stream. In addition, a second virtual play list (Virtual PlayList 2) is produced and recorded. In this case, the second virtual play list is recorded with the play item (PlayItem), which is duplicated from the play item of the first virtual play list, for the main path adapted to read out and reproduce the first clip main A/V stream linked to the first real play list, and a sub play item (SubPlayItem) for a sub path adapted to read out and reproduce the third clip dubbed audio stream linked to the third real play list.

That is, the VDR system 3 produces virtual play lists, the number of which corresponds to the number of dubbed audio streams associated with each of clip-unit main A/V streams, for reading and reproduction of the dubbed audio streams. The virtual play lists are recorded with a common play item for a main path adapted to read out and reproduce the associated clip-unit main A/V stream and with sub play items for distinct sub paths adapted to read out and reproduce the dubbed audio streams corresponding to the virtual play lists, respectively.

Figure 4:
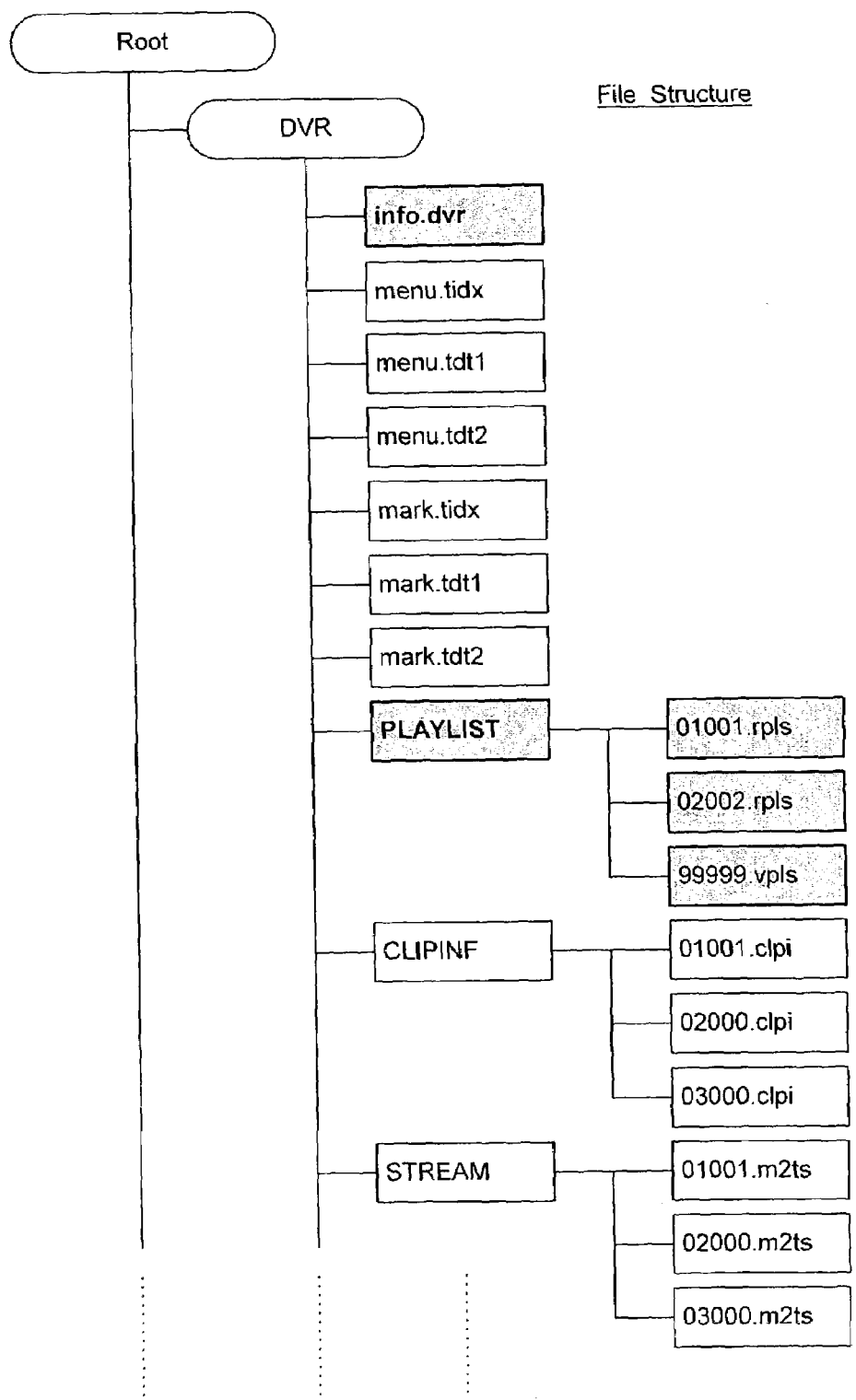

The real play lists and virtual play lists produced in the above described procedure are recorded and managed as play list files *.rpls and *.vpls in a 'PLAY LIST' subdirectory included in the file structure of the BD-RE 1, respectively as shown in FIG. 4, for example. Also, play list management information for each multi-dubbed audio stream is also produced for searching and managing all of the play list files. This play list management information is recorded in an 'info.dvr' file included in a 'DVR' directory having an order lower than a highest-order 'Root' directory.

The play list management information may be recorded in the form of a data block, data_block, in a manufacturer's private data recording area, MakersPrivateData, arranged in the 'info.dvr' file for the manufacturer of the BD-RE to optionally record desired diverse information.

As shown in FIG. 5, the play list management information recorded in the form of the data block data block in the manufacturer's private data recording area includes information multi_dub_exit_flag about a flag set in the case of additionally recording multiple dubbed audio streams for each clip-unit main A/V stream, multi-dubbed virtual play list numbers, set multi_dub_VPL_number, produced and recorded when the flag is set, information ref_RPL_index about an index for referring to the real play list linked to the play item for the main path included in the virtual play lists associated with the multiple dubbed audio streams, information dub_total_VPL_number about the total number of the virtual play lists respectively corresponding to the multiple dubbed audio streams, and information VPL_index[j] about indexes for respective virtual play lists corresponding to the multiple dubbed audio streams.

Since the above described play list management information for each multi-dubbed audio stream is recorded in the form of a data block in the manufacturer's private data recording area provided in the 'info.dvr' file in accordance with the multi-dubbed audio stream recording and reproduction managing method of the present invention, the predetermined syntax of the 'info.dvr' file is maintained as it is. Also, the predetermined file structure of the BD-RE is maintained as it is.

Alternatively, the play list management information for each multi-dubbed audio stream may be recorded in a region, other than the manufacturer's private data recording area, provided in the 'info.dvr' file, for example, an area between a play list table information (TableOfPlayList) recording area and the manufacturer's private data recording area.

Meanwhile, the VDR system 3 searches for and refers to the play list management information about multiple dubbed audio streams additionally recorded in the 'info.dvr' file, thereby identifying whether or not there are multiple dubbed audio streams recorded on the BD-RE. If there are multiple dubbed audio streams, then the VDR system 3 identifies virtual play list information for reading and reproduction of the multiple dubbed audio streams, and information about the total number of virtual play lists associated with the multiple dubbed audio streams.

Thereafter, the VDR system 3 reads out and reproduces a main A/V stream and the multiple dubbed audio streams linked to the identified virtual play lists. For example, the VDR system 3 can selectively reproduce the second clip dubbed audio stream managed by the second real play list or the third clip dubbed audio stream managed by the third real play list at the request of the user during a reproducing operation thereof in which the first clip main A/V stream managed by the first real play list is read out and reproduced. Thus, the user can view the video image of the first clip main A/V stream and simultaneously listen to the audio sound of the second clip dubbed audio stream or the third clip dubbed audio stream.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

As apparent from the above description, the present invention provides a method for managing recording and reproduction of a multi-dubbed audio stream in accordance with the present invention which is capable of additionally recording and managing multiple dubbed audio streams for each clip-unit main A/V stream, and selectively reproducing diverse dubbed audio streams desired by the user. Thus, the present invention is very useful.

What is claimed is:

1. A method for managing recording of a multi-dubbed audio stream corresponding to a clip-unit main A/V stream, comprising:
   (A) producing play lists, the number of which corresponds to the number of dubbed audio streams desired by a user in association with the clip-unit main A/V stream, for reading and reproduction of the dubbed audio streams; and
   (B) recording common link information, for reading and reproduction of the clip-unit main A/V stream, in the play lists, while recording distinct link information, for reading and reproduction of the dubbed audio streams associated therewith, in the play lists, respectively,
   wherein the step (A) further comprises recording play lists managing the dubbed audio streams associated with the clip-unit main A/V stream, the number of the play lists corresponding to the number of the dubbed audio streams.

2. The method according to claim 1, wherein the step (B) comprises recording a common play item in the produced play lists, linked to a play list corresponding to the clip-unit main A/V stream, while recording sub play items in the produced play list, linked to the play lists corresponding to the dubbed audio streams, respectively.

3. A method for recording and managing a multi-audio stream, comprising:
   producing and recording play lists for reading and reproduction of a clip-unit main A/V stream and a plurality of audio streams associated with the clip-unit main A/V stream, respectively; and
   recording management information for searching for and reading out the play lists, in a file included in a directory having an order lower than a highest-order root directory in a file structure of a recording medium.

4. The method according to claim 3, wherein the management information is recorded in the form of a data block in a manufacturer's private data recording area provided in the file.

5. The method according to claim 3, wherein the management information comprises at least one of information about a flag set when the audio streams are recorded, multi-audio play list numbers produced and recorded only when the flag is set, information about an index for a play list linked to a play item for a main path recorded in each of the play lists, information about the total number of the play lists respectively corresponding to the multiple audio streams, and information about indexes for the play lists corresponding to the multiple audio streams, respectively.

6. A method for managing reproduction of a multi-audio stream, comprising:
   (A) searching for and reading out play list management information about multiple audio streams, which is recorded in a file, other than play list files, provided in a file structure of a recording medium; and
   (B) reading out and reproducing a main A/V stream and multiple audio streams respectively linked to play lists identified by referring to the play list management information,
   wherein the step (A) comprises searching for and reading out play list management information for multiple audio streams recorded in the file included in a directory having an order lower than a highest-order root directory in the file structure of the recording medium.

7. The method according to claim 6, wherein the step (A) comprises searching for and reading out play list management information for multiple audio streams recorded in the form of a data block in a manufacturer's private data recording area provided in the file.

8. The method according to claim 7, wherein the step (B) comprises:
   identifying whether or not there are multiple audio streams recorded on the rewritable storage medium, by referring to the play list management information for multiple audio streams;
   if there are multiple audio streams, then identifying information about play lists for reading and reproduction of the multiple audio streams, and information about the total number of the play lists; and
   reading out and reproducing a main A/V stream and the multiple audio streams respectively linked to the play lists.

* * * * *